(12) United States Patent
Chaney (10) Patent No.: US 7,783,205 B1
(45) Date of Patent: Aug. 24, 2010

(54) LEARNING INFRARED AMPLIFIER FOR REMOTE CONTROL DEVICES

(75) Inventor: Steve Chaney, San Jose, CA (US)

(73) Assignee: Universal Electronics Inc., Cypress, CA (US)

( * ) Notice: Subject to any disclaimer, the term of this patent is extended or adjusted under 35 U.S.C. 154(b) by 1247 days.

(21) Appl. No.: 11/341,347

(22) Filed: Jan. 26, 2006

(51) Int. Cl.
 *H04B 10/06* (2006.01)
(52) U.S. Cl. .................. 398/202; 398/208; 398/209; 398/135; 398/136; 330/59; 330/308; 250/214 A; 250/214 R; 250/214 AG; 250/214 LA
(58) Field of Classification Search .............. 398/202, 398/203, 204, 208, 209, 210, 213, 214, 135, 398/136, 138, 128, 130; 330/59, 308; 250/214 A, 250/214 R, 214 AG, 214 LA
See application file for complete search history.

(56) References Cited

U.S. PATENT DOCUMENTS

2003/0194244 A1* 10/2003 Doh et al. ................ 398/202
2004/0190912 A1* 9/2004 Seo et al. ................ 398/202
2005/0179558 A1* 8/2005 Williams et al. ....... 340/825.69

* cited by examiner

*Primary Examiner*—Hanh Phan
(74) *Attorney, Agent, or Firm*—Greenberg Traurig, LLP (57) ABSTRACT

A learning remote "learns" both a digital code carried by an infrared operational signal as well as a timing characteristic (for example, time period) of a carrier used to modulate the operational signal. When the photodiode of the learning remote is close to the transmitter of the remote to be learned from, a low frequency saturation current is superimposed on the intelligence signal. Rather than using a fixed reference voltage to detect when the carrier component of the intelligence signal transitions, an adaptive reference voltage (VAR) is used. A comparator compares a photocurrent voltage to VAR. Because VAR is maintained between the envelope of positive peaks and the envelope of negative peaks of the photocurrent voltage despite changes in the low frequency current, the comparator detects each transition of the carrier component. A microcontroller timer determines the time between transitions output by the comparator and thereby determines the timing characteristic.

19 Claims, 8 Drawing Sheets

FIG. 1
(PRIOR ART)

MARK - SPACE MODULATION
(USING RECS80 CODING)

LEARNING INFRARED AMPLIFIER FOR REMOTE CONTROL DEVICES

TECHNICAL FIELD

The present invention relates to a learning infrared amplifier circuit, and more particularly to a learning infrared amplifier circuit of a learning universal remote control device.

BACKGROUND

A typical household may have numerous electronic consumer devices that are controlled by remote control devices. A household may, for example, have multiple televisions, set-top boxes, tuners, home theatre systems, CD (compact disc) players, DVD (digital video disc) players, as so forth. Each such electronic consumer device typically is responsive to a different set of operational signals. Accordingly, each electronic consumer device is sold with its own remote control device that transmits appropriate operational signals for controlling the electronic consumer device. The coffee table in front of the television in the typical household can be covered with numerous such remote control devices to control the multitude of electronic consumer devices within the home.

A remote control device called a "universal remote control device" has an ability to output different types of operational signals for controlling different types of electronic consumer devices. When a user presses a key on the universal remote control device (hereafter "universal remote"), the universal remote uses an amount of information called a "codeset" to determine how to generate a corresponding operational signal that is transmitted from the universal remote. Operational signals for each different make and model of electronic consumer device are generated using a different codeset. Operational signals for a first device (for example, a television of a particular make and model) may, for example, be generated using a first codeset whereas operational signals for a second device (for example, a tuner of a particular make an model) may, for example, be generated using a second codeset. If a user wishes to control the first device, then the user first presses a device type key (for example, the "TV" device type key) on the universal remote. Thereafter, operational signals generated by the universal remote are generated using the first codeset. These operational signals control the first device (in this case, the "TV"). If the user then wishes to control the second device, then the user presses another device type key (for example, the "TUNER" device type key) on the universal remote. Thereafter, operational signals generated by the universal remote are generated using the second codeset. These operational signals control the second device (in this case, the tuner).

To program the universal remote to control a desired electronic consumer device, a user generally identifies the make and model of the electronic consumer device in a booklet supplied with the universal remote, finds an associated codeset number listed in the booklet, and then follows procedures to key the codeset number into the universal remote in association with the type of device with which the codeset is to be identified. Thereafter, when a key is pressed on the universal remote, the universal remote uses the identified codeset to generate operational signals. There are now thousands and thousands of various televisions and other types of electronic consumer devices that universal remotes are to be able to control. Nevertheless, universal remotes store many codesets and can accommodate the large number of devices.

Despite the large number of codesets typically stored in universal remotes, it is often desired to be able to control an exotic or unusual or new remote control device for which there is no codeset stored in the universal remote. Consequently, a feature sometimes called a "learning" feature has been incorporated into some universal remotes. The learning feature usually takes advantage of the fact that most remote controls transmit infrared light operational signals. An infrared detector is therefore incorporated into the learning universal remote. This infrared detector senses the infrared operational signal transmitted from another remote control device and converts the infrared operational signal into a photocurrent signal. Circuitry in the learning universal remote analyzes the photocurrent signal, and stores information about the signal. When a user later presses a key on the learning universal remote, the learning universal remote uses the stored information to generate and transmit a facsimile of the learned operational signal. Because the learning remote control device can now generate the operational signals of the other remote control device, the other remote control device is no longer needed. In this way, the learning remote control device can be made to "learn" operational signals from multiple other remote control devices so that the single learning remote control device can then be used in place of the numerous other remote control devices.

Figure 1:
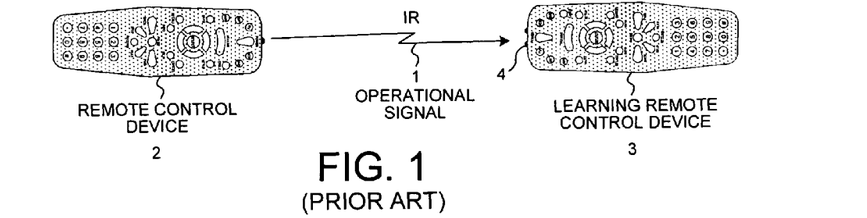
FIG. 1 (Prior Art) is a diagram of an infrared operational signal 1 being transmitted from a remote control device 2 to a learning remote control device 3.

FIG. 1 (Prior Art) is a diagram of an infrared operational signal 1 being transmitted from a remote control device 2 to a learning remote control device 3. The infrared operational signal 1 is received by an infrared photodiode 4 of learning remote 3. When infrared operational signal 1 is received by infrared photodiode 4, a reverse photodiode current is made to flow through the photodiode 4. The reverse photodiode current carries the information being conveyed in operational signal 1.

Figure 2:
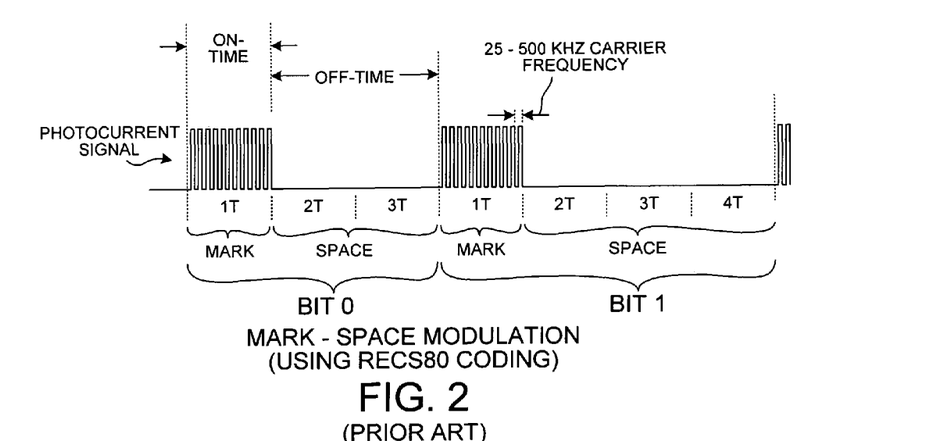
FIG. 2 (Prior Art) is a diagram of a photocurrent signal that flows through the photodiode 4 in the learning remote control device of FIG. 1 when the infrared operational signal 1 is being learned by learning remote control device 3. The on-times of the photocurrent signal are modulated with a carrier signal.

FIG. 2 (Prior Art) is a simplified diagram of the photodiode current in an example of FIG. 1 where the operational signal 1 is mark-space modulated using RECS80 coding. The photocurrent signal includes mark times and space times. During a mark time, the photocurrent pulses on and off at a carrier frequency. The carrier frequency may range, depending on the modulation technique and codeset, from approximately 25 KHz to 500 KHz. In the illustrated example, a digital zero (BIT 0) is encoded as one such mark time followed by two space times. The mark time is an "on-time" and the two space times together form an "off-time". A digital one (BIT 1) is encoded as a mark time followed by three space times. The mark time is an "on-time" and the three space times together form an "off-time". The sequence of digital bits is detected in learning remote 3 and constitutes the information carried by operational signal 1.

Electronic consumer device manufacturers often incorporate tuned detector circuits into electronic consumer device to detect such operational signals. The tuned detector circuit in a particular electronic consumer device may be sensitive to only a narrow range of carrier frequencies used by the remote control device supplied along with the electronic consumer device. Consequently, if a learning universal remote is to be capable of learning operational signals encoded using a wide range of different carrier frequencies, then the learning universal remote cannot use a tuned detector circuit. Rather, a detector circuit that is able to detect multiple different carrier frequencies is to be used.

Figure 3:
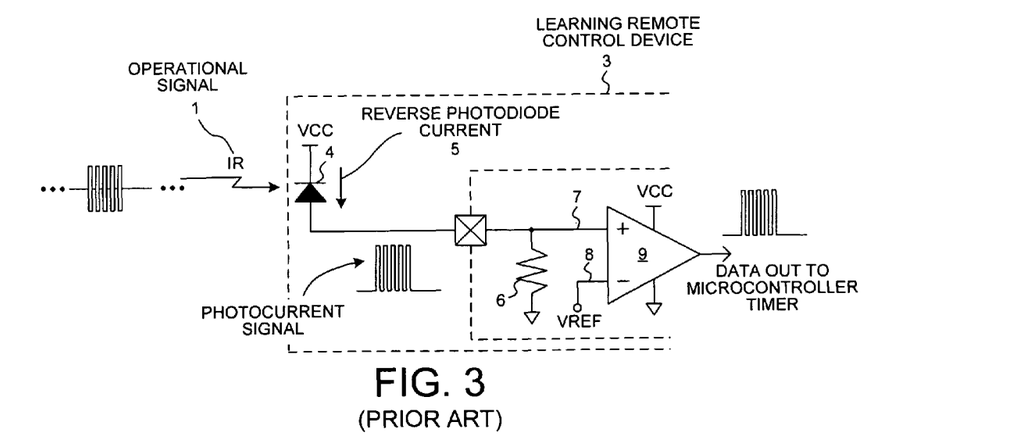
FIG. 3 (Prior Art) is a simplified circuit diagram of learning remote control device 3.

FIG. 3 (Prior Art) is a simplified diagram of a non-tuned infrared photodetector circuit that is used in learning universal remote control device 3. The reverse current 5 flowing through photodiode 4 depends on the intensity of the incoming infrared light of operational signal 1. When the user wishes to teach the learning universal remote device to learn the unknown operational signal, then the learning universal remote device is placed with respect to the remote control device 2 to be learned from as shown in FIG. 1 such that the infrared photodiode 4 of the learning universal remote device 3 can pick up the infrared operational signal 1 transmitted from the remote control device 2 to be learned from. Photocurrent 5 is made to flow through a fifty ohm resistor 6 to convert the photocurrent into a corresponding voltage signal. The voltage signal on node 7 is compared to a fixed reference voltage VREF on node 8. If the magnitude of the photocurrent voltage signal is higher than VREF, then a digital high is output by comparator 9. If the magnitude of the photocurrent voltage signal is lower than VREF, then a digital low is output by comparator 9. Accordingly, each pulse of the carrier frequency modulation signal in the photocurrent signal is detected and is output as a pulse.

From learning attempt to learning attempt, the distance between the two remote control devices 2 and 3 can change. Devices 2 and 3 can be nose-to-nose in which case the infrared energy received by photodiode 4 can be large. Devices 2 and 3 can be several feet apart in which case the infrared energy received by photodiode 4 is small. The variations in infrared signal intensities as received gives rise to a problem. If the infrared transmitter on device 2 is too close to the infrared detector on device 3, then the photodiode 4 may no longer recover to its original dark condition between light pulses. Photocurrent 5 may not decay fast enough because the photodiode is driven into saturation. This saturation is evident as a lower frequency saturation current that is superimposed on higher frequency (carrier frequency) intelligence signal being detected. The intelligence signal, as described above, is modulated at the carrier frequency.

Figure 4:
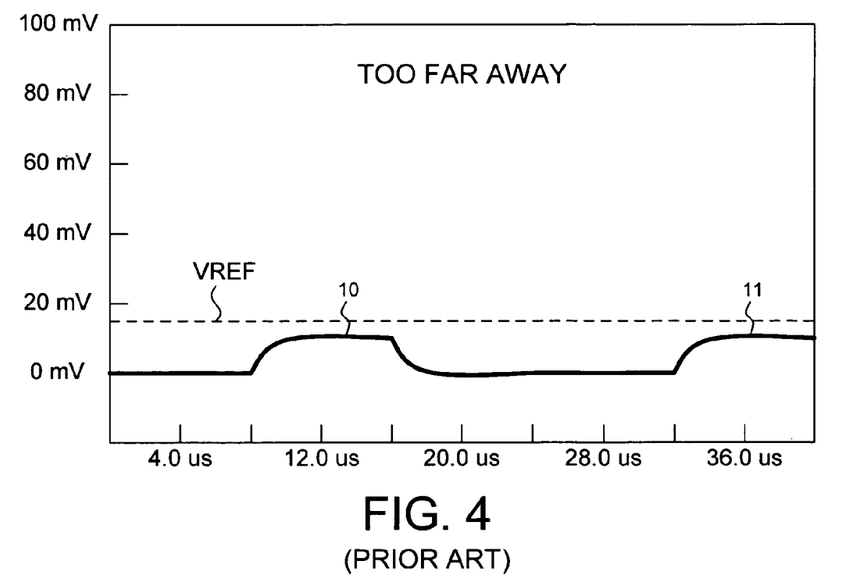
FIG. 4 (Prior Art) is a waveform diagram of a photocurrent voltage signal on node 7 in the detector of FIG. 3 when remote control devices 2 and 3 are too far apart for the learning feature to work properly.

FIG. 4 (Prior Art) is a waveform diagram of a photocurrent voltage signal on node 7 in the detector of FIG. 3 when remote control devices 2 and 3 are too far apart for the learning feature to work properly. The positive peaks of the pulses 10 and 11 of the carrier frequency component of photocurrent 5 are below the reference voltage VREF. The pulses 10 and 11 are therefore not detected by comparator 9.

Figure 5:
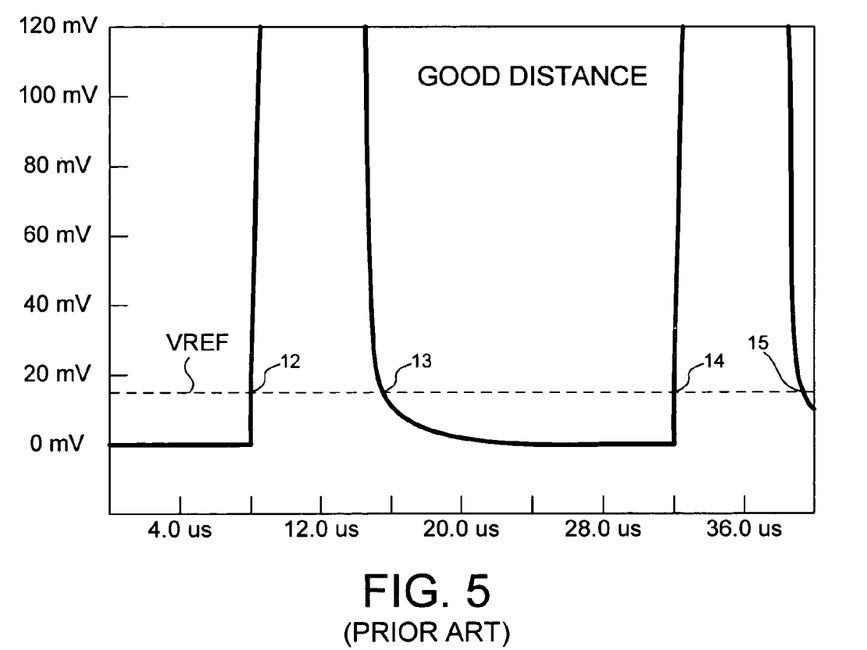
FIG. 5 (Prior Art) is a waveform diagram of a photocurrent voltage signal on node 7 in the detector of FIG. 3 when remote control devices 2 and 3 are separated by a good distance.

FIG. 5 (Prior Art) is a waveform diagram of a photocurrent voltage signal on node 7 in the detector of FIG. 3 when remote control devices 2 and 3 are separated by a good distance. The two photocurrent voltage pulses are large and the peaks of the pulses are off the chart. Nonetheless, the photocurrent voltage signal decays to zero voltage between pulses. The points 12-15 at which the photocurrent voltage signal crosses the reference voltage VREF are usable to detect the pulse times of the carrier frequency modulated pulses with adequate precision.

Figure 6:
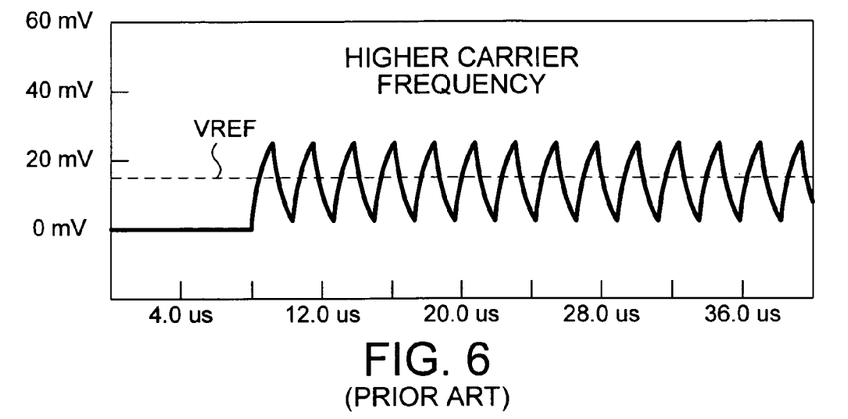
FIG. 6 (Prior Art) is a waveform diagram of a photocurrent voltage signal on node 7 in the detector of FIG. 3. The carrier frequency in the example of FIG. 6 is, however, higher than the carrier frequency in the example of FIGS. 4 and 5.

FIG. 6 (Prior Art) is a waveform diagram of a photocurrent voltage signal on node 7 in the detector of FIG. 3. The carrier frequency in the example of FIG. 6 is, however, higher than the carrier frequency in the example of FIGS. 4 and 5. The points at which the photocurrent voltage signal crosses the reference voltage VREF are still usable to detect the pulse times of the carrier frequency modulated pulses.

If the remote control devices 2 and 3 in the higher frequency carrier example of FIG. 6 are, however, brought close together (nose to nose), then the learning remote control device 3 does not properly detect the pulse time of the carrier frequency modulated pulses.

Figure 7:
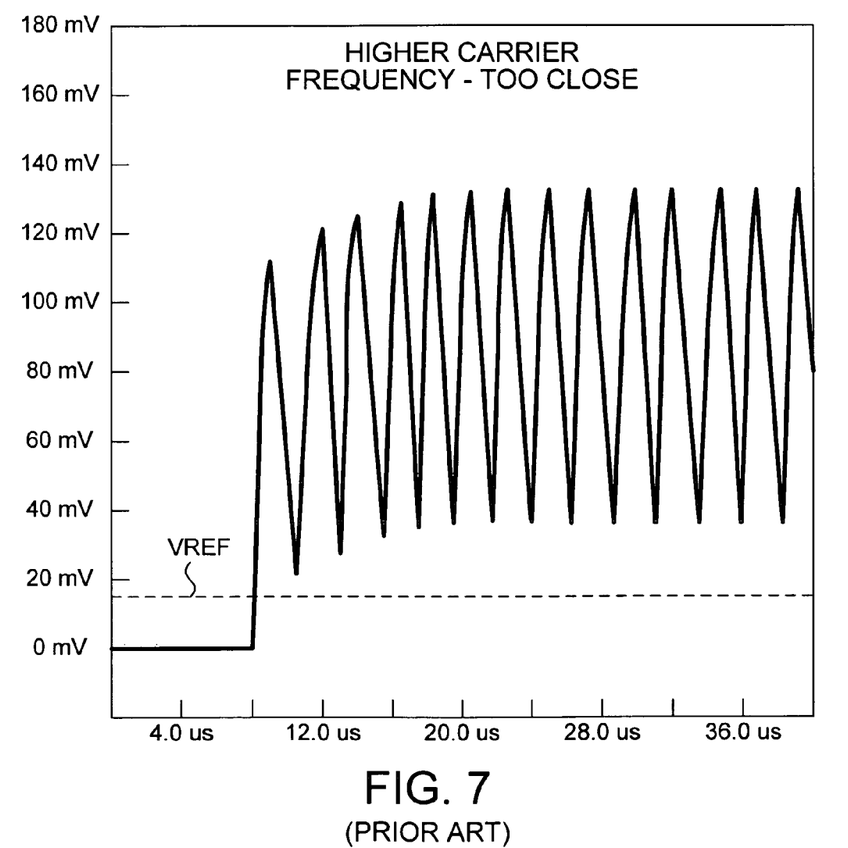
FIG. 7 (Prior Art) is a waveform diagram of a photocurrent voltage signal on node 7 in the detector of FIG. 3 when the learning remote control device is brought closer to the learning remote control device being learned from. The carrier frequency in the example of FIG. 7 is the same as in the example of FIG. 6.

FIG. 7 (Prior Art) illustrates this situation. The intensity of the infrared operational signal 1 as received by photodiode 4 causes photodiode 4 to saturate. This gives rise to a lower frequency saturation current that is superimposed on the carrier frequency component of the photocurrent signal. Due to the low frequency saturation current, the valleys of the photocurrent voltage signal (see FIG. 7) do not return to zero between pulses. Reference voltage VREF is below the envelope of the negative peaks of the photocurrent voltage signal. Comparator 9 therefore does not detect individual carrier frequency pulses. Although the learning feature of the remote 3 may be able to learn the individual bits encoded, remote 3 cannot properly learn the carrier frequency. Because the infrared detector of the electronic consumer device to be controlled is a tuned circuit, just learning the individual bits encoded does not generally enable the regeneration of the operational signal. As explained above, the receiver in the electronic consumer device to be controlled may be tuned so that it only receives operational signals having the proper carrier frequency.

In an attempt to solve the problem of not being able to detect the carrier frequency as illustrated in FIG. 7, conventional learning remote control devices may be supplied with instructions to place the two remotes a certain distance apart. Conventional instructions may also instruct the user to go through a trial and error process at different distances until the learning feature works. These cumbersome techniques are undesirable. An effective and inexpensive solution is desired.

SUMMARY

A learning infrared remote control device "learns" both a digital code carried by an infrared operational signal as well as a timing characteristic (for example, cycle time period) of a carrier signal used to modulate the on-time of the infrared operational signal. When the infrared photodiode of the learning remote is close to the transmitter of the remote to be learned from, a low frequency photodiode saturation current may be superimposed on the intelligence signal that is modulated at the higher carrier frequency. Rather than using a fixed reference voltage to detect when the photocurrent voltage transitions, an inexpensive adaptive reference signal circuit is provided. The adaptive reference signal circuit outputs an adaptive reference voltage (VAR) that is used in the detection. The adaptive reference signal circuit maintains VAR between the envelope of positive peaks of the photocurrent voltage signal and the envelope of negative peaks of the photocurrent voltage signal despite changes in the low frequency saturation current.

If the learning remote control device is close to the remote control device being learned from, then the low frequency saturation current may be large but the adaptive reference signal circuit nonetheless maintains VAR between the envelope of positive peaks of the photocurrent voltage signal and the envelope of negative peaks of the photocurrent voltage signal. If the learning remote control device is far away from the remote control device being learned from, then there may be no low frequency saturation current component to the photocurrent but the adaptive reference signal circuit nonetheless maintains VAR between the envelope of positive peaks of the photocurrent voltage signal and the envelope of negative peaks of the photocurrent voltage signal.

The photocurrent is converted into a photocurrent voltage by running the photocurrent through a resistor. A comparator compares a photocurrent voltage to the VAR. Because the VAR is maintained between the envelope of positive peaks of the photocurrent and the envelope of negative peaks of the photocurrent despite changes in the low frequency saturation current, the comparator properly detects each transition of the carrier component of the photocurrent voltage signal. A timer circuit of a microcontroller in the learning remote determines the amount of time between transitions output by the comparator and thereby determines the timing characteristic (for example, cycle time period) of the carrier signal. The determined timing characteristic information is then later usable by the learning remote control device to generate an infrared operational signal. The generated infrared operational signal is modulated using a carrier signal in the same way that the learned operational signal was. The carrier frequency of the carrier signal of the generated infrared operation signal is substantially the same as the carrier frequency of the infrared operational signal learned.

Other embodiments, methods, advantages and considerations are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 8:
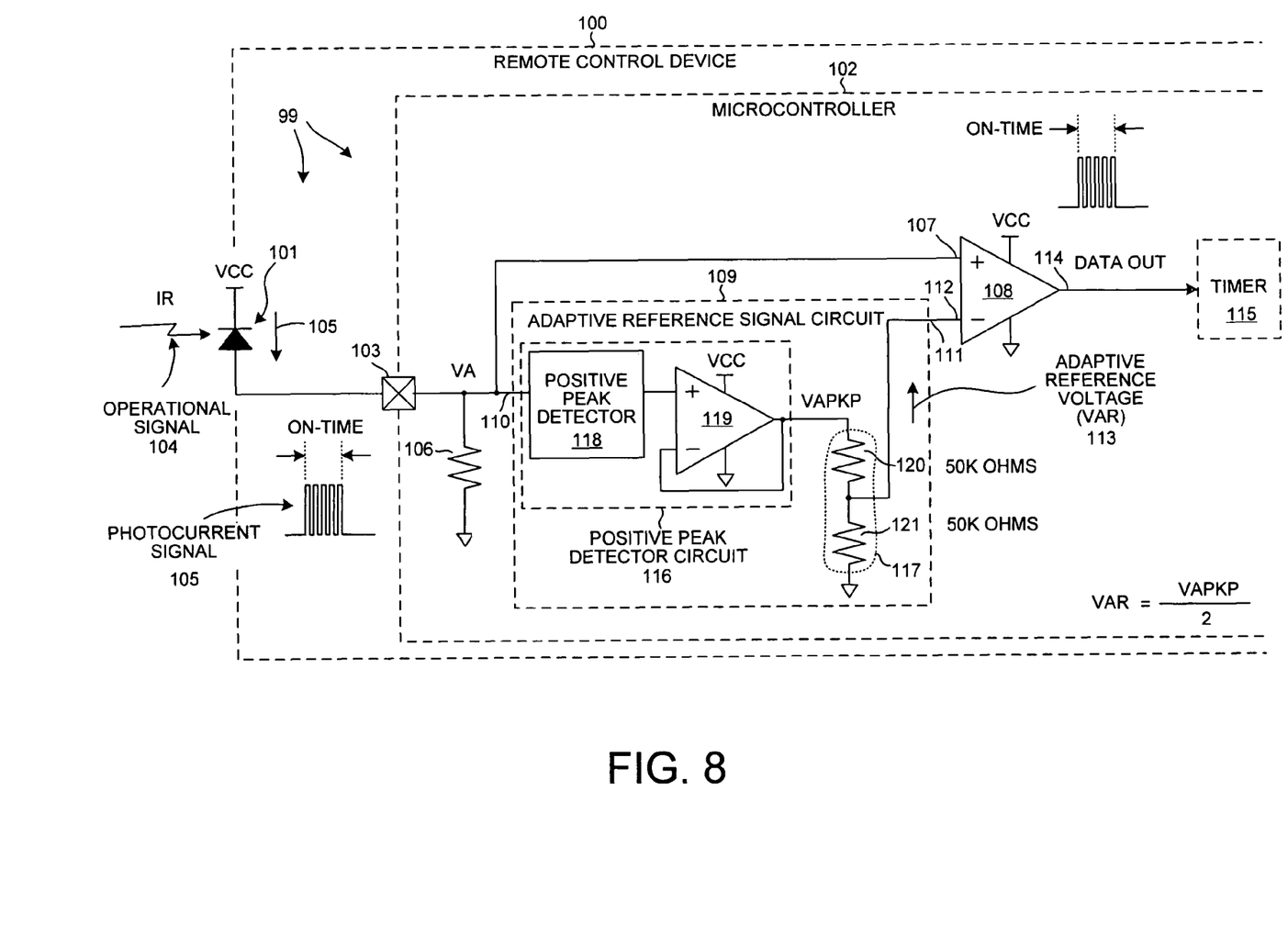
FIG. 8 is a simplified circuit diagram of circuitry 99 within a learning remote control device 100 in accordance with a first novel aspect.

FIG. 8 is a circuit diagram of circuitry 99 within a learning remote control device 100 in accordance with one novel aspect. Learning remote control device 100 is for controlling an electronic consumer device such as, for example, a television, set-top box, tuner, home theatre system, CD (compact disc) player, or DVD (digital video disc) player.

Circuitry 99 includes an infrared photodector 101 (for example, a photodiode) and a microcontroller integrated circuit 102. Microcontroller integrated circuit 102 includes a terminal 103. A first terminal of photodiode 101 is coupled to receive a supply voltage VCC whereas a second terminal of photodiode 101 is coupled to terminal 103. An infrared operational remote control signal 104 is incident on photodiode 101. As the intensity of infrared light of operational signal 104 changes, the magnitude of a photocurrent 105 flowing through photodiode 101 changes. Photocurrent 105 flows into microcontroller integrated circuit 102 through terminal 103 and through a resistor 106 to ground potential. Resistor 106 is used to convert photocurrent 105 into a corresponding photocurrent voltage signal (VA).

The noninverting input lead 107 of a comparator 108 is coupled to terminal 103 so that the photocurrent voltage signal (VA) is received onto the noninverting input lead 107. An adaptive reference signal circuit 109 has an input lead 110 and an output lead 111. Input lead 110 is coupled to terminal 103 so that input lead 110 receives the photocurrent voltage signal (VA). Output lead 111 is coupled to an inverting input lead 112 of comparator 108 so that an adaptive reference voltage signal (VAR) 113 output by adaptive reference signal circuit 109 is supplied onto the inverting input lead 112 of comparator 108. An output lead 114 of comparator 108 is coupled to an input lead of a timer circuit 115 of microcontroller integrated circuit 102. Timer circuit 115 may, for example, be a general purpose timer of microcontroller 102. In the present example, adaptive reference signal circuit 109 includes a positive peak detector circuit 116 and a voltage dividing circuit 117. Because the two resistors 120 and 121 that make up the voltage dividing circuit 117 have equal resistances, the voltage dividing circuit 117 outputs a voltage that is half the magnitude of the voltage it receives from positive peak detector circuit 116. Positive peak detector circuit 116 includes a positive peak detector 118 and an amplifier circuit 119 that is connected as a voltage follower. In operation, adaptive reference signal circuit 109 generates the adaptive reference voltage signal (VAR) 113 so that the magnitude of the adaptive reference voltage signal is the positive peak voltage (VAPKP) divided by two.

Figure 9:
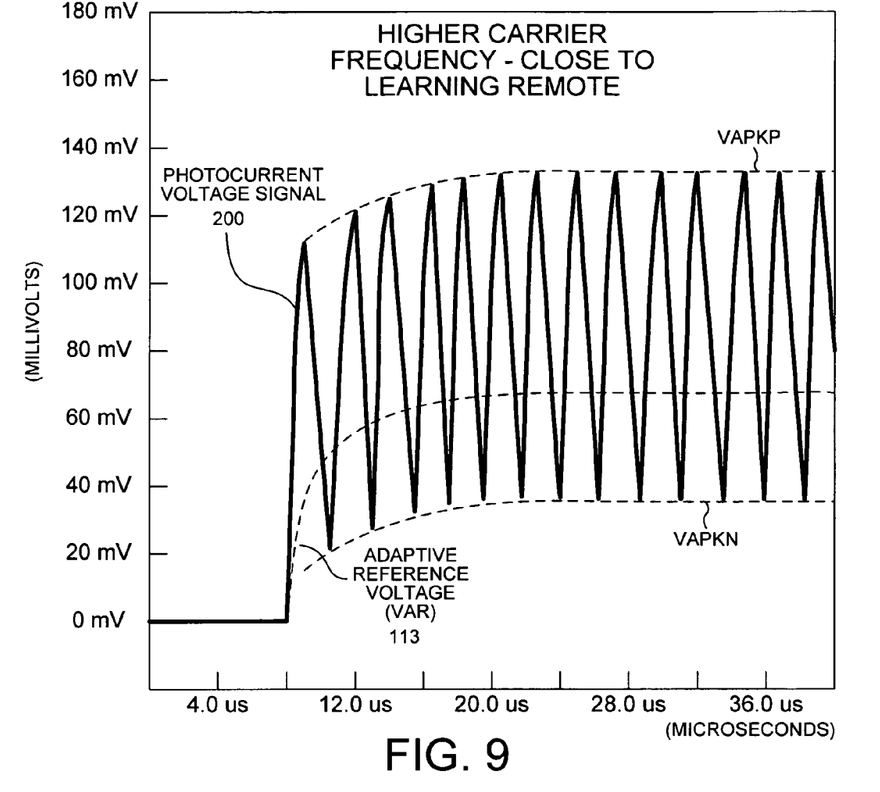
FIG. 9 is a waveform diagram of an operation of the circuit of FIG. 8. The waveform represents photocurrent voltage signal (VA) present on terminal 103 of microcontroller 102 under the same higher carrier frequency and proximity conditions of FIG. 7. The adaptive reference voltage signal (VAR) is between the envelope of positive peaks (VAPKP) of the photocurrent voltage signal and the envelope of negative peaks (VAPKN) of the photocurrent voltage signal.

FIG. 9 is a waveform diagram of an operation of the circuit of FIG. 8. Waveform 200 represents photocurrent voltage signal (VA) present on terminal 103 of microcontroller 102. Photocurrent voltage signal (VA) has a zero millivolt amplitude from time zero until 8.0 microseconds in the diagram. This amount of time represents the end of the space times (an "off-time") within operational signal 104. FIG. 9 illustrates fourteen pulses that occur between time 8.0 microseconds to time 40.0 microseconds. These pulses in the photocurrent voltage signal are due to pulses in photocurrent 105. The pulses have a carrier frequency rate of approximately 500 KHz. The fourteen pulses illustrated in FIG. 9 represent the beginning of a mark time (an "on-time") within operational signal 104.

The waveform of FIG. 9 was generated when photodiode 101 of the learning remote control device 100 was placed close to the remote control device from which the carrier frequency is to be learned. The magnitude of the carrier frequency component of the signal (that varies between the envelope VAPKP of the positive peaks and the envelope VAPKN of the negative peaks) is therefore relatively large. In the present example, the negative peak envelope at time 36.0 microseconds is approximately 30 millivolts and the positive peak envelope at time 36.0 is approximately 130 millivolts. The magnitude of the carrier frequency component is therefore said to be approximately 100 millivolts. Due to the high intensity of infrared light received onto photodiode 101, a lower frequency saturation current voltage signal is superimposed on the higher carrier frequency signal. This lower frequency saturation current voltage signal is also represented by the waveform labeled VAPKN in FIG. 9. At time 36.0 microseconds, the lower frequency saturation current voltage signal has a magnitude of approximately 30.0 millivolts. The negative peak value (30 mV) at time 36.0 microseconds is at least twenty percent of the positive peak value (130 mV).

Rather than supplying a constant voltage reference signal VREF onto non-inverting input lead 112 as in the conventional circuit of FIG. 3, adaptive reference signal circuit 109 generates adaptive reference voltage signal (VAR) 113 that is between the negative peak envelope VAPKN and the positive peak envelope VAPKP. Because the photocurrent voltage signal on noninverting input lead 107 of comparator 108 crosses the adaptive reference voltage (VAR) signal twice during each period of the carrier frequency, the DATA OUT signal output by comparator 108 onto output lead 114 also transitions twice. Timer circuit 115 times the amount of time between successive rising edges of the DATA OUT signal, and in this way determines the cycle time period of the carrier frequency component of photocurrent 105.

In the embodiment of FIG. 8, adaptive reference signal circuit 109 works by generating a signal that approximates the envelope VAPKP of the positive peaks of the photocurrent voltage signal. A positive peak detector involving a diode and a leaky capacitor can be employed as peak detector 118. The peak detect signal is supplied to voltage follower 119 that supplies the peak detector signal VAPKP to resistive voltage divider circuit 117. As explained above, voltage divider circuit 117 divides the positive peak detect signal VAPKP in half. The positive peak detect signal VAPKP divided by two is therefore the adaptive reference voltage signal VAR that is supplied to the noninverting input lead 112 of comparator 108. Accordingly, as the positive peak detect signal VAPKP increases in voltage amplitude, so too does the adaptive reference voltage signal VAR. As the positive peak detect signal VAPKP decreases, so too does the adaptive reference voltage signal VAR.

Figure 10:
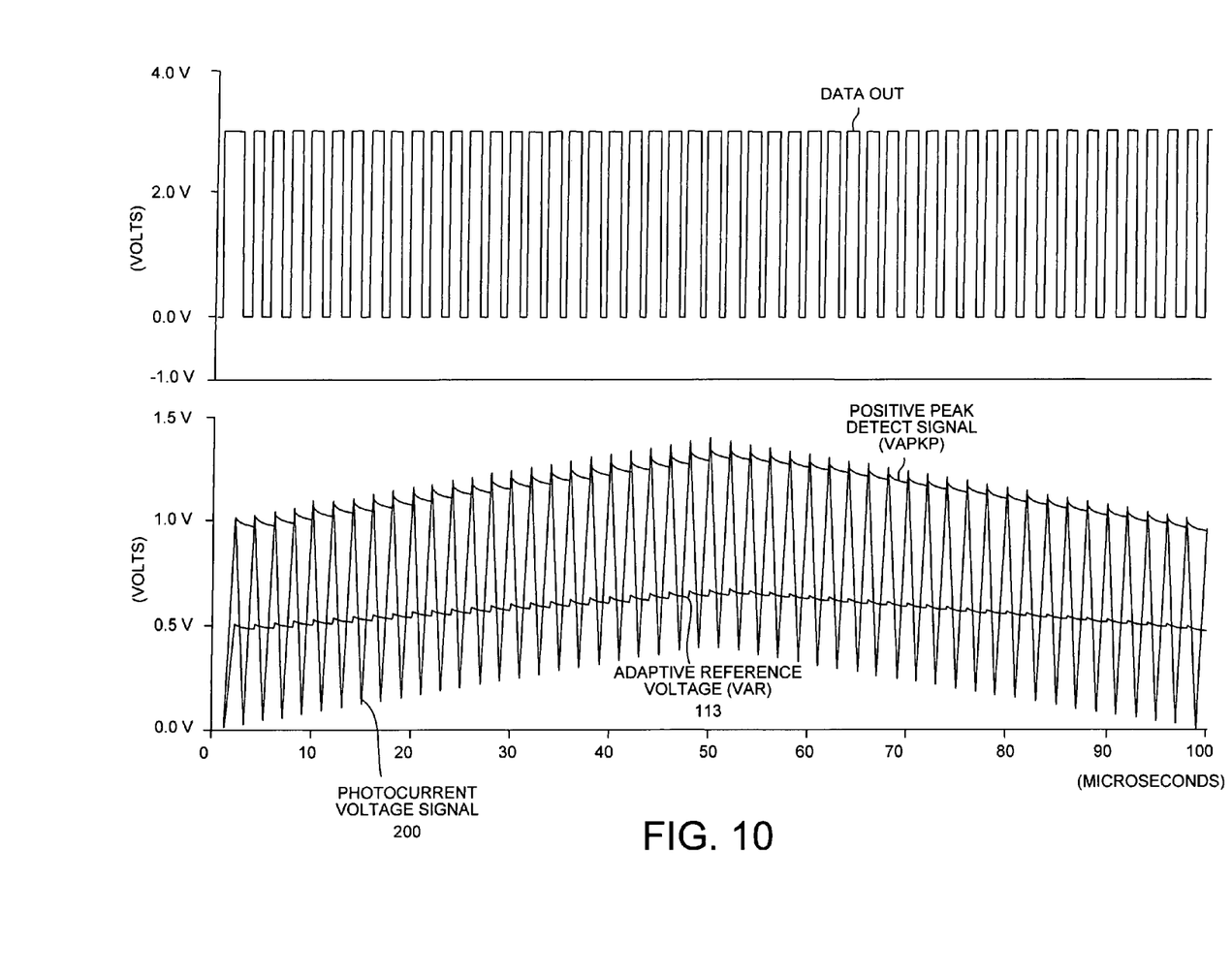
FIG. 10 is another waveform diagram illustrating another example of operation of the circuit of FIG. 8. The learning remote control device is moved closer to the remote control device being learned from, and is then moved farther away.

FIG. 10 is another waveform diagram illustrating another example of operation of the circuit 99 of FIG. 8. The learning remote control device is moved closer to the remote control device being learned from in the time period from zero to fifty microseconds, and is then moved back away again in the time period from fifty microseconds to one hundred microseconds. Note that the adaptive reference voltage signal VAR has a magnitude that is half of the positive peak detect signal. Despite that fact that the envelope of the negative peaks of the photocurrent voltage signal increases up until time 50 microseconds and then decreases to time 100 microseconds, the adaptive reference voltage signal VAR 113 is always between the positive peak envelope VAPKP and the envelope of the negative peaks. The upper waveform in FIG. 10 illustrates the resulting DATA OUT signal that is output by comparator 108. The duty cycle of the DATA OUT signal changes, but the period of the DATA OUT signal remains substantially constant. Because timer circuit 115 measures the period of the DATA OUT signal, the timer circuit 115 can measure the period of the carrier frequency component of the photocurrent signal 105 at any time in FIG. 10 and the result will be a fairly constant measurement of the period. (The waveform of the adaptive reference voltage VAR in FIG. 9 is for peak detector 118 being an ideal peak detector, whereas the waveform of the adaptive reference voltage VAR in FIG. 10 is for peak detector 118 being an actual peak detector. The slight differences in the waveforms of the VAR signal in FIGS. 9 and 10 are due to the different peak detector circuits.)

Figure 11:
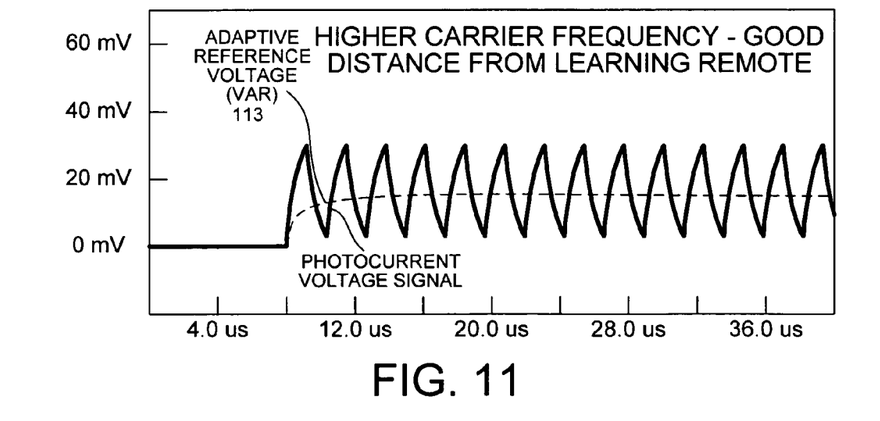
FIG. 11 is a waveform diagram of an operation of the circuit of FIG. 8. The waveform represents photocurrent voltage signal (VA) present on terminal 103 of microcontroller 102 under the same higher carrier frequency and proximity conditions of FIG. 6. The adaptive reference voltage signal (VAR) is between the envelope of positive peaks (VAPKP) of the photocurrent voltage signal and the envelope of negative peaks (VAPKN) of the photocurrent voltage signal.

FIG. 11 is a waveform diagram that illustrates an operation of the circuit 99 of FIG. 8 where the learning remote control device 100 is farther away from the transmitting remote control device than in the example of FIG. 9, but where the carrier frequency and other operating parameters are otherwise identical to those of FIG. 9. Due to the increased distance between the transmitting remote control device and the learning remote control device, the magnitude of the carrier frequency component of the photocurrent voltage signal is less. In the example of FIG. 11, the carrier frequency component varies between approximately 25 millivolts and zero millivolts. The magnitude of the carrier frequency component is therefore said to be approximately 25 millivolts. The envelope of the negative peaks of the photocurrent voltage signal is very close of ground potential throughout the amount of time illustrated in FIG. 11. The magnitude of the low frequency component due to photodiode saturation is therefore approximately zero. Because the adaptive reference signal circuit 109 outputs an adaptive reference voltage signal VAR 113 that has a magnitude that is half of the magnitude of the positive peak envelope VAPKP of the photocurrent voltage signal, the adaptive reference voltage signal VAR 113 during the mark time in FIG. 11 has a magnitude of approximately 12 millivolts. Accordingly, despite the fact that there is essentially no low frequency saturation current component to photocurrent 105, the adaptive reference voltage signal VAR 113 supplied to the inverting input lead 112 of comparator 108 is nonetheless between the positive peak envelope VAPKP of the photocurrent voltage signal and the negative peak envelope of the photocurrent voltage signal. The photocurrent voltage signal crosses the adaptive reference voltage signal VAR 113 twice during each period of the carrier frequency component of the photocurrent 105. Comparator 105 therefore outputs a pulse each period as in the case of FIG. 9. Timer circuit 115 measures the time between successive rising edges of the DATA OUT signal, and therefore properly measures the period of the carrier frequency component of the photocurrent signal 105. The processor of microcontroller 102 controls and reads timer circuit 115, thereby obtaining information about the carrier frequency component. This information (for example, a period time) is then usable to generate operational signals when a key is later pressed on the learning remote control device. The operational signal generated by the learning remote control device 100 mimics the operational signal learned in that the generated operational signal has the same or substantially the same carrier frequency as the operational signal learned and in that the generated operational signal can control the electronic consumer device in the same way that the learned operational signal did.

The manufacture of remote control devices can be extremely cost competitive. Reducing the manufacturing cost of a remote control device by even a few cents can make a great difference in the ability to sell the remote control device in the market. The circuit 99 of FIG. 8 advantageously includes only one discrete component (photodiode 101) external to microcontroller integrated circuit 102. Avoiding the use of additional discrete components reduces manufacturing cost of the learning remote control device.

Figure 12:
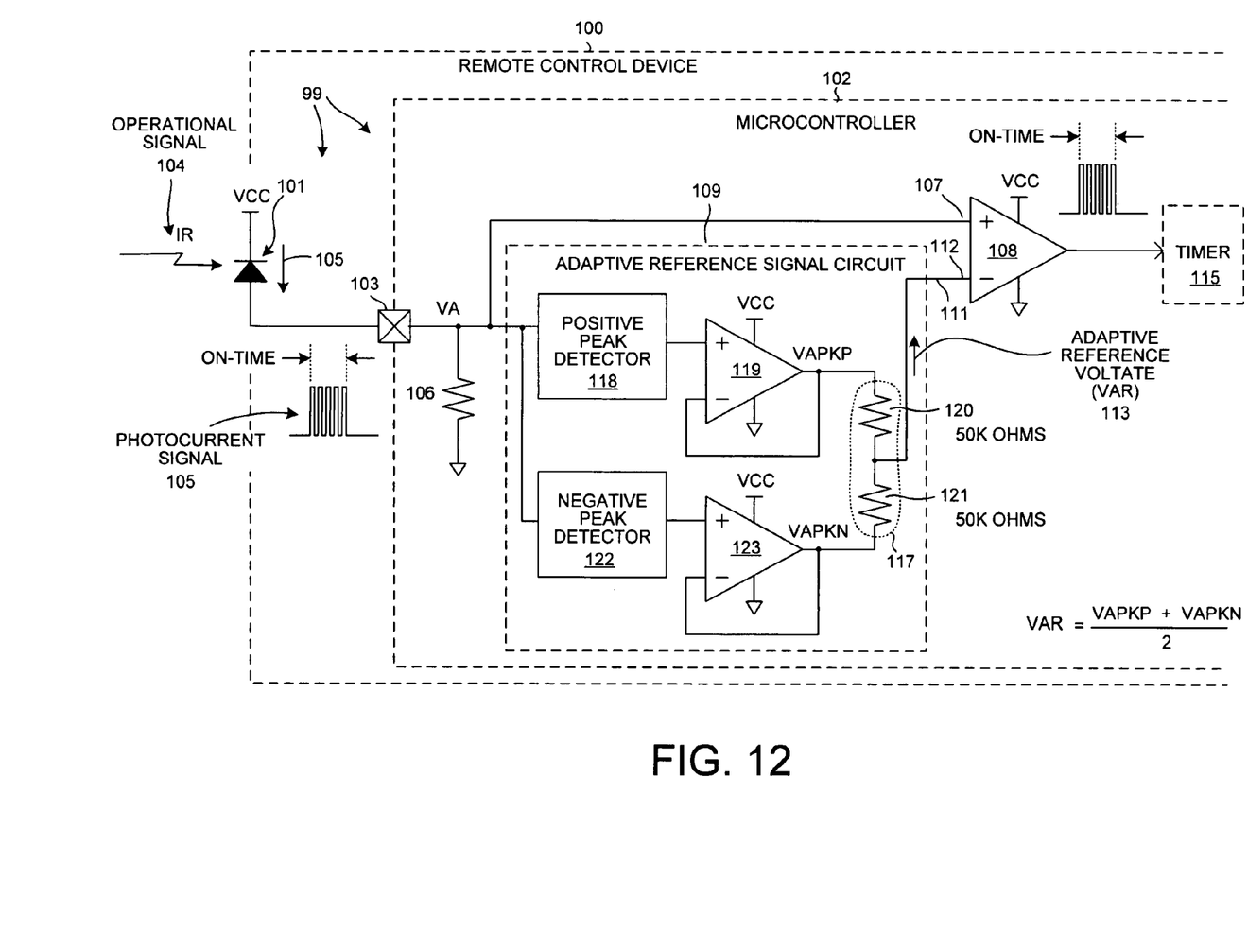
FIG. 12 is a simplified circuit diagram of circuitry within a learning remote control device 100 in accordance with a second novel aspect. The adaptive reference signal circuit includes both a positive peak detector circuit as well as a negative peak detector circuit.

FIG. 12 illustrates another embodiment of circuit 99. Adaptive reference signal circuit 109 includes an additional negative peak detector 122 and an additional voltage follower amplifier 123. Rather than maintaining adaptive reference voltage VAR 113 halfway between the positive peak envelope signal VAPKP and ground potential as in the embodiment of FIG. 8, the voltage divider circuit 117 maintains adaptive reference voltage VAR 113 halfway between the positive peak envelope signal VAPKP and the negative peak envelope signal VAPKN.

Figure 13:
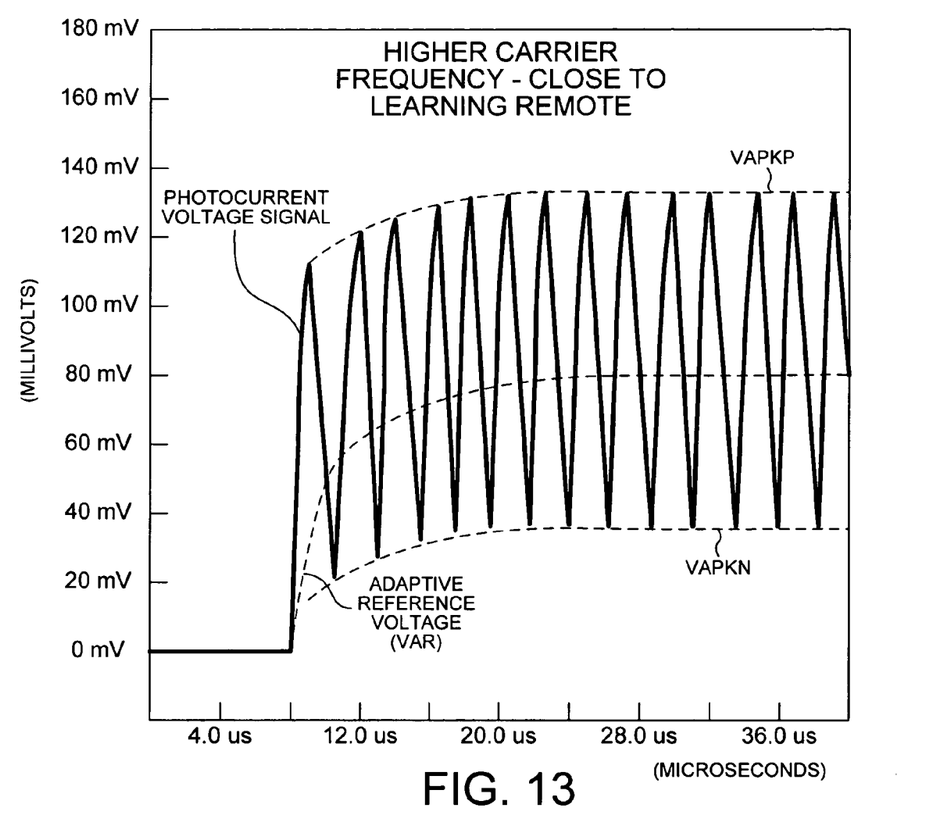
FIG. 13 is a waveform diagram of an operation of the circuit of FIG. 12. The waveform represents photocurrent voltage signal (VA) present on terminal 103 of microcontroller 102 under the same higher carrier frequency and proximity conditions of FIG. 7. The adaptive reference voltage signal (VAR) is between the envelope of positive peaks (VAPKP) of the photocurrent voltage signal and the envelope of negative peaks (VAPKN) of the photocurrent voltage signal.

FIG. 13 illustrates operation of the embodiment of FIG. 12 when it is receiving the same photocurrent signal as in the situation described above in connection with FIG. 9. Whereas in the example of FIG. 9 the adaptive reference voltage signal VAR 113 is halfway between the positive peak envelope VAPKP and ground potential, in the example of FIG. 13 the adaptive reference voltage signal VAR 113 is halfway between the positive peak envelope signal VAPKP and the negative peak envelope signal VAPKN.

Figure 14:
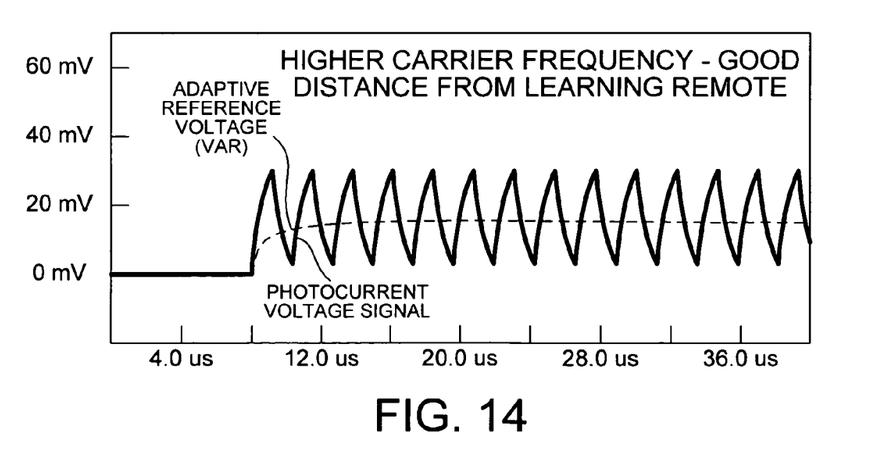
FIG. 14 is a waveform diagram of an operation of the circuit of FIG. 8. The waveform represents photocurrent voltage signal (VA) present on terminal 103 of microcontroller 102 under the same higher carrier frequency and proximity conditions of FIG. 6. The adaptive reference voltage signal (VAR) is between the envelope of positive peaks (VAPKP) of the photocurrent voltage signal and the envelope of negative peaks (VAPKN) of the photocurrent voltage signal.

FIG. 14 illustrates operation of the embodiment of FIG. 12 when it is receiving the same photocurrent signal 105 as in the situation described above in connection with FIG. 11. Because there is essentially no low frequency saturation current component in photocurrent 105 in the examples of FIGS. 11 and 14, the adaptive reference voltage signals VAR in FIGS. 11 and 14 are essentially identical.

Although the present invention has been described in connection with certain specific embodiments for instructional purposes, the present invention is not limited thereto. Although a circuit is described above that uses a voltage comparator to compare a photocurrent voltage signal to an adaptive reference voltage, a comparator or differential amplifier circuit can be employed that compares currents. An adaptive reference current can be compared directly to the photodiode reverse current into order to detect transitions at the carrier frequency. Accordingly, various modifications, adaptations, and combinations of various features of the described embodiments can be practiced without departing from the scope of the invention as set forth in the claims.

What is claimed is:

1. A circuit, comprising:
    an infrared photodiode having a first terminal and a second terminal;
    an adaptive reference signal circuit having an input lead and an output lead, wherein the input lead is coupled to the second terminal of the photodiode;
    a comparator having a first input lead, a second input lead, and an output lead, wherein the first input lead is coupled to the second terminal of the photodiode, and wherein the second input lead is coupled to the output lead of the adaptive reference signal circuit; and
    a timer, the timer having an input lead that is coupled to the output lead of the comparator, wherein a photocurrent flows through the infrared photodiode during an operational signal on-time, the photocurrent having a carrier frequency component and a low frequency component, the photocurrent having a positive peak and a negative peak during a cycle of the carrier frequency component, wherein the negative peak is a non-zero current, wherein the positive peak is a non-zero current, and wherein the negative peak is at least twenty percent of the positive peak.

2. The circuit of claim 1, further comprising:
    a resistor having a first lead and a second lead, the first lead being coupled to the second terminal of the infrared photodiode, wherein a photocurrent flows through the infrared photodiode, and wherein the photocurrent flows through the resistor.

3. The circuit of claim 1, wherein a photocurrent flows through the infrared photodiode during an operational signal on-time, the photocurrent having a carrier frequency component and a low frequency component, wherein the adaptive reference signal circuit outputs an adaptive reference voltage onto the output lead of the adaptive reference signal circuit, wherein the adaptive reference voltage has a first magnitude if an amplitude of the low frequency component has a first magnitude, and wherein the adaptive reference voltage has a second magnitude if the amplitude of the low frequency component has a second magnitude.

4. The circuit of claim 1, wherein the adaptive reference signal circuit comprises a peak detector.

5. The circuit of claim 1, wherein the adaptive reference signal circuit and the comparator are parts of a microcontroller integrated circuit, the microcontroller integrated circuit having a terminal, the terminal being coupled to the input lead of the adaptive reference signal circuit and also being coupled to the second terminal of the photodiode.

6. The circuit of claim 1, wherein the adaptive reference signal circuit comprises:
    a positive peak detector having an input lead and an output lead, the input lead being coupled to the input lead of the adaptive reference signal circuit;
    a negative peak detector having an input lead and an output lead, the input lead being coupled to the input lead of the adaptive reference signal circuit; and
    a voltage dividing circuit having a first input lead, a second input lead, and an output lead, the first input lead being coupled to the output lead of the positive peak detector, the second input lead being coupled to the output lead of the negative peak detector, the output lead being the output lead of the adaptive reference signal circuit.

7. The circuit of claim 1, wherein the adaptive reference signal circuit and the comparator are parts of a microcontroller, the microcontroller determining a timing characteristic of the carrier frequency component, the timing characteristic being taken from the group consisting of: a pulse duration, a cycle time, a frequency, and a duty cycle.

8. An integrated circuit comprising:
a terminal;
an adaptive reference signal circuit having an input lead and an output lead, wherein the input lead is coupled to the terminal;
a comparator having a first input lead, a second input lead, and an output lead, wherein the first input lead is coupled to the terminal, and wherein the second input lead is coupled to the output lead of the adaptive reference signal circuit; and
timer circuitry having an input lead, the input lead being coupled to the output lead of the comparator, wherein the timer circuitry is adapted to determine a timing characteristic of a remote control photocurrent signal present on a remote control photocurrent signal present on the terminal, wherein the remote control photocurrent signal has a carrier frequency component and a low frequency component, the remote control photocurrent signal having a positive peak and a negative peak during a cycle of the carrier frequency component, wherein the negative peak is a non-zero current, wherein the positive peak is a non-zero current, and wherein the negative peak is at least twenty percent of the positive peak.

9. The integrated circuit of claim 8, wherein the adaptive reference signal circuit comprises a positive peak detector.

10. The integrated circuit of claim 8, wherein the adaptive reference signal circuit comprises a positive peak detector and a negative peak detector.

11. The integrated circuit of claim 8, wherein the timer circuitry comprises a timer and a processor, and wherein the integrated circuit is a microcontroller.

12. A method, comprising:
receiving a remote control photocurrent, the remote control photocurrent having a carrier frequency component and a low frequency component, the remote control photocurrent having a positive peak and a negative peak during a cycle of the carrier frequency component, wherein the negative peak is a non-zero current, wherein the positive peak is a non-zero current, and wherein the negative peak is at least twenty percent of the positive peak;
generating an adaptive reference signal from the remote control photocurrent, wherein the adaptive reference signal has a magnitude during said cycle, the magnitude being between the positive peak and the negative peak;
comparing the remote control photocurrent to the adaptive reference signal to generate an output signal; and
providing the output signal to a timing circuit where the timing circuit uses the output signal to determine a timing characteristic of the remote control photocurrent.

13. The method of claim 12, wherein said adaptive reference signal is a voltage signal, wherein said comparing involves converting the remote control photocurrent into a photocurrent voltage and comparing the photocurrent voltage to the voltage signal.

14. The method of claim 12, wherein said generating involves:
detecting a peak of the remote control photocurrent and thereby generating a peak voltage; and
supplying the peak voltage to a voltage divider, the voltage divider outputting the adaptive reference signal.

15. The method of claim 12, wherein said generating involves:
detecting a positive peak of the remote control photocurrent and thereby generating a positive peak voltage;
detecting a negative peak of the remote control photocurrent and thereby generating a negative peak voltage; and
supplying the positive peak voltage and the negative peak voltage to a voltage divider, the voltage divider outputting the adaptive reference signal.

16. A method comprising:
receiving a remote control photocurrent signal onto a microcontroller integrated circuit, the remote control photocurrent signal having a carrier frequency component and a low frequency component, the remote control photocurrent signal having a positive peak and a negative peak during a cycle of the carrier frequency component, wherein the negative peak is a non-zero signal value, wherein the positive peak is a non-zero signal value, and wherein the negative peak is at least twenty percent of the positive peak, wherein the microcontroller integrated circuit is for detecting the positive peak of the remote control photocurrent signal thereby generating an adaptive reference signal, the microcontroller integrated circuit also being for comparing the adaptive reference signal to the remote control photocurrent signal; and
using the microcontroller integrated circuit to determine a timing characteristic of the carrier frequency component of the remote control photocurrent signal, the timing characteristic being taken from the group consisting of: a pulse duration, a cycle time, a frequency, and a duty cycle.

17. The method of claim 16, wherein the remote control photocurrent signal is a voltage signal.

18. The method of claim 16, wherein the remote control photocurrent signal is a current signal.

19. A microcontroller integrated circuit comprising:
a terminal that receives a remote control photocurrent signal during an on-time of an operational signal, the remote control photocurrent signal having a carrier frequency component and a low frequency component, the remote control photocurrent signal having a positive peak and a negative peak during a cycle of the carrier frequency component, wherein the negative peak is a non-zero signal value, wherein the positive peak is a non-zero signal value, and wherein the negative peak is at least twenty percent of the positive peak; and
means, coupled to the terminal, for determining a timing characteristic of the carrier frequency component of the remote control photocurrent signal, the timing characteristic being taken from the group consisting of: a pulse duration, a cycle time, a frequency, and a duty cycle, wherein the means is for detecting the positive peak of the remote control photocurrent signal thereby generating an adaptive reference signal, the means also being for comparing the adaptive reference signal to the remote control photocurrent signal.

* * * * *

UNITED STATES PATENT AND TRADEMARK OFFICE
CERTIFICATE OF CORRECTION

| | | |
|---|---|---|
| PATENT NO. | : 7,783,205 B1 | Page 1 of 1 |
| APPLICATION NO. | : 11/341347 | |
| DATED | : August 24, 2010 | |
| INVENTOR(S) | : Steve Chaney | |

It is certified that error appears in the above-identified patent and that said Letters Patent is hereby corrected as shown below:

On the Title Page:

(73) Assignee: should be "UEI Cayman Inc."

Signed and Sealed this
Nineteenth Day of July, 2011

David J. Kappos
*Director of the United States Patent and Trademark Office*